United States Patent Office 2,975,172
Patented Mar. 14, 1961

2,975,172

9α-HALO-11β,16α,17α-TRIHYDROXYPREGNENES AND INTERMEDIATES THEREFOR

Josef Fried, Princeton, N.J., assignor to Olin Mathieson Chemical Corporation, New York, N.Y., a corporation of Virginia No Drawing. Filed Jan. 7, 1958, Ser. No. 707,463

8 Claims. (Cl. 260—239.55)

This application is a continuation-in-part of my parent application, Serial No. 677,205, filed August 9, 1957.

This invention relates to the synthesis of valuable steroids, and has for its objects: (I) the provision of new steroids of the general formula

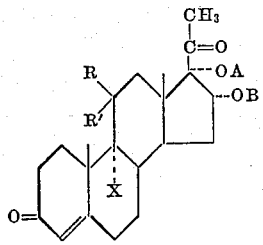

wherein the 1,2-position is saturated or double-bonded, R is hydrogen, R' is β-hydroxy or together R and R' is keto, X is halogen, individually A and B are hydrogen and together A and B represent a lower alkylidene or cycloalkylidene radical; (II) the provision of certain new intermediates useful in the preparation of these final products; and (III) an advantageous process for preparing the final products.

The process of this invention essentially comprises: (a) interacting either $\Delta^{4,9(11),16}$-pregnatriene-3,20-dione or $\Delta^{1,4,9(11),16}$-pregnatetraene-3,20-dione with osmium tetroxide, the reaction preferably being conducted in an inert organic solvent for the steroid reactant in the presence of organic base, such as pyridine, to yield the new intermediates of this invention, namely, $\Delta^{4,9(11)}$-pregnadiene-16α,17α-diol-3,20-dione and $\Delta^{1,4,9(11)}$-pregnatriene-16α,17α-diol-3,20-dione, respectively; (b) treating the intermediates thus formed with either a brominating or chlorinating agent in the presence of water, the preferred brominating agents being the N-bromamides and N-bromimides or carboxylic acids (e.g. N-bromamides of lower alkanoic acids, such as N-bromacetamide, N-bromimides of lower alkanedioic acids, such as N-bromsuccinimide) and dibromodimethylhydantoin, and the preferred chlorinating agents being the corresponding chloro compounds, the reaction preferably being conducted in an aqueous inert organic solvent, such as an alcohol, ketone, or either in the presence of a strong acid, such as perchloric acid, to increase the yield of the desired 9α-halo steroid, thereby forming those final products of this invention wherein R is hydrogen, R' is β-hydroxy, X is bromo or chloro, and A and B are hydrogen; (c) treating the 9α-bromo or chloro 11β-hydroxy steroids with a basic reagent such as the alkali metal salt of a lower fatty acid in a lower fatty acid (e.g. an alkali metal acetate in acetic acid) to form the corresponding 9β,11β-epoxy derivatives, namely, 9β,11β-epoxy-16α,17α-dihydroxyprogesterone and 9β,11β-epoxy-$\Delta^{1,4}$-pregnadiene-16α,17α-diol-3,20-dione; (d) reacting the 9β,11β-epoxy steroid with a hydrogen halide (e.g. hydrochloric acid and hydrofluoric acid) to yield the corresponding 9α-halo-11β-hydroxy derivative; (e) treating the resulting 16α,17α-dihydroxy steroid with an aldehyde or ketone to yield the corresponding 16,17 acetal and ketal derivative (A and B are alkylidene or cycloalkylidene); and (f) if desired, oxidizing the resulting 11β-hydroxy steroid to an 11-keto, as by treatment with an oxidizing agent such as a hexeualent chromium compound (e.g. chromic acid). Suitable aldehydes and ketones for step e in the process include aldehydes such as formaldehyde, trioxymethylene, paraldehyde, propanal, and hexanal; di(lower alkyl)ketones, such as acetone, diethylketone, dibutylketone, methylethylketone, and methylisobutylketone; and cycloalkanones, such as cyclopentanone, cyclohexanone, suberone, and cyclodexanone. The reaction is preferably carried out by treating a suspension or solution of the 16α,17α-dihydroxy steroid in the aldehyde or ketone with an acid catalyst (e.g. perchloric acid, p-toluene sulfonic acid, and hydrochloric acid), neutralizing the acid and recovering the alkylidene or cycloalkylidene derivative formed.

The final products of this invention are physiologically active substances which possess glucocorticoid and antiinflammatory activity and hence can be used in lieu of known glucocorticoids such as hydrocortisone and cortisone in the treatment of rheumatoid arthritis, for which purpose they can be administered in the same manner as hydrocortisone, for example, the dosage being adjusted for the relative potency of the particular steroid.

The process of this invention can be illustrated by the following equations employing $\Delta^{4,9(11),16}$-pregnatriene-3,20-dione as the starting material:

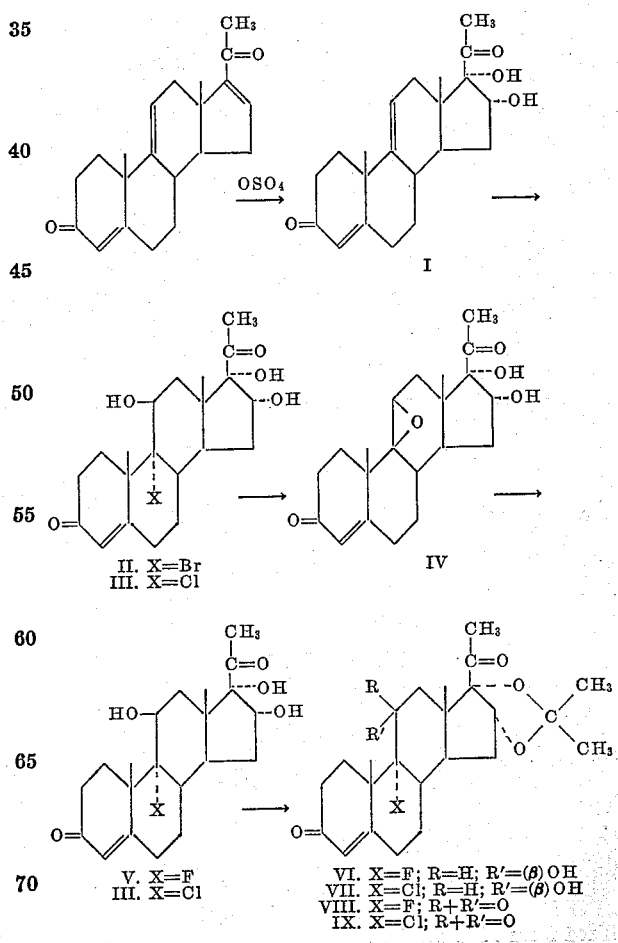

II. X=Br
III. X=Cl

IV

V. X=F
III. X=Cl

VI. X=F; R=H; R'=(β)OH
VII. X=Cl; R=H; R'=(β)OH
VIII. X=F; R+R'=O
IX. X=Cl; R+R'=O

The following examples are illustrative of the invention (all temperatures being in centigrade):

EXAMPLE 1

$\Delta^{4,9(11)}$-pregnadiene-16α,17α-diol-3,20-dione (I)

To a solution of 75 mg. of $\Delta^{4,9(11),16}$-pregnatriene-3,20-dione in 5 ml. of benzene and 0.1 ml. of dry pyridine is added 65 mg. of osmium tetroxide. The solution immediately darkens and is allowed to stand in a dark place overnight. For decomposition of the osmic acid ester formed there is added to the benzene solution 7 ml. of water, 4.6 ml. of methanol, 700 mg. of sodium sulfite and 700 mg. of potassium bicarbonate. The resulting mixture is stirred for 4 hours at room temperature, diluted with 20 ml. of chloroform, filtered and the precipitate washed thoroughly with chloroform. The chloroform phase is separated off, washed with water, dried over sodium sulfate and evaporated to dryness in vacuo. The residue after crystallization from 95% ethanol furnishes pure $\Delta^{4,9(11)}$-pregnadiene-16α,17α-diol-3,20-dione of the following properties: M.P. about 205–207°; $[\alpha]_D^{23}$ +79° (c. 0.39 in chlf.):

$\lambda_{max}^{alc.}$ 239 mμ (ε=18,600); $\lambda_{max}^{Nujol}$ 3.01, 5.87, 6.09, 6.23μ

*Analysis.*—Calcd. for $C_{21}H_{28}O_4$ (344.44): C, 73.22; H, 8.19. Found: C, 73.76; H, 7.62.

EXAMPLE 2

9α-bromo-11β,16α,17α-trihydroxyprogesterone (II)

To a solution of 86 mg. of $\Delta^{4,9(11)}$-pregnadiene-16α,17α-diol-3,20-dione in 9.3 ml. of dioxane and 5.6 ml. of ⅓ N perchloric acid is added 61 mg. of N-bromoacetamide. The resulting solution is allowed to stand in the dark for 1 hour and the reaction stopped by the addition of a dilute sodium sulfite solution. Chloroform is added and after separation of the layers, the chloroform-dioxane is washed with dilute sodium bicarbonate and water. After drying over sodium sulfate the chloroform is evaporated to dryness in vacuo. The residue upon crystallization from acetone furnishes 9α-bromo-$\Delta^4$-pregnene-11β,16α,17α-triol-3,20-dione.

EXAMPLE 3

9α-chloro-11β,16α,17α,-trihydroxyprogesterone (III)

Following the procedure of Example 2, but substituting an equivalent amount of N-chloroacetamide for the N-bromoacetamide, there is obtained 9α-chloro-11β,16α,17α-trihydroxyprogesterone.

EXAMPLE 4

9β,11β-epoxy-16α,17α-dihydroxyprogesterone (IV)

A solution of 43 mg. of 9α-bromo-$\Delta^4$-pregnene-11β,16α,17α,-triol-3,20-dione and 170 mg. of potassium acetate in 4.5 ml. of absolute alcohol is refluxed for 1 hour. The mixture is diluted with water and extracted with chloroform. The chloroform extract is washed with water, dried over sodium sulfate and evaporated to dryness in vacuo. The residual epoxide is obtained in pure form after recrystallization from acetone-hexane.

EXAMPLE 5

9α-chloro-11β,16α,17α-trihydroxyprogesterone (III)

To a solution of 71 mg. of 9β,11β-epoxy-$\Delta^4$-pregnene-16α,17α-diol-3,20-dione in 7 ml. of chloroform is added at 0°, 1.05 ml. of 0.5 N hydrogen chloride in chloroform. The solution is allowed to stand at room temperature for 1 hour, and then extracted with dilute sodium bicarbonate solution. The chloroform solution is washed with water, dried over sodium sulfate and the solvent removed in vacuo. The resulting chlorohydrin is recrystallized from 95% alcohol.

EXAMPLE 6

9α-fluoro-11β,16α,17α-trihydroxyprogesterone (V)

Into a solution of 200 mg. of 9β,11β-oxido-$\Delta^4$-pregnene-16α,17α-diol-3,20-dione in 19 ml. of chloroform and 1 ml. of absolute alcohol is passed at 0° hydrogen fluoride gas. After a period of 6 minutes there has formed 2 layers and the reaction is allowed to proceed without further addition of hydrogen fluoride for 1 hour and 20 minutes. The mixture is neutralized with a suspension of sodium bicarbonate in water, the chloroform extract washed with water, dried over sodium sulfate and evaporated to dryness in vacuo. The residue upon crystallization from acetone, furnishes pure 9α-fluoro-$\Delta^4$-pregnene-11β,16α,17α-triol-3,20-dione of the following properties: M.P. about 238–240°; $[\alpha]_D^{23}$ +105° (c. 0.38 in acetone);

$\lambda_{max}^{alc.}$ 238 mμ (ε=17,000); $\lambda_{max}^{Nujol}$ 2.88, 2.95, 3.08, 5.85, 6.02, 6.19μ

*Analysis.*—Calcd. for $C_{21}H_{29}O_5F$ (380.44): C, 66.29; H, 7.68. Found: C, 65.88; H, 7.66.

This substance possesses activity equal to cortisone acetate in the rat liver glycogen assay.

Similarly, by substituting $\Delta^{1,4,9(11),16}$-pregnatetraene for the pregnatriene in the procedure of Example 1 and following the procedures of Examples 1, 2, 4, 5, and 6, there is obtained, respectively: $\Delta^{1,4,9(11)}$-pregnatriene-16α,17α-diol-3,20-dione, 9α-bromo - $\Delta^{1,4}$ - pregnadiene-11β,16α,17α-triol-3,20-dione, 9β,11β-epoxy-$\Delta^{1,4}$ - pregnadiene-16α,17α-diol-3,20-dione, 9α-chloro-$\Delta^{1,4}$-pregnadiene-11β,16α,17α-triol-3,20-dione, and 9α-fluoro-$\Delta^{1,4}$-pregnadiene-11β,16α,17α-triol-3,20-dione.

EXAMPLE 7

16α,17α-isopropylidene 9α-fluoro-11β,16α,17α-trihydroxyprogesterone (VI)

To a suspension of 272 mg. of 9α-fluoro-$\Delta^4$-pregnene-11β,16α,17α-triol-3,20-dione in 38 ml. of acetone is added 0.025 ml. of 70% aqueous perchloric acid and the mixture stirred at room temperature for 90 minutes. The mixture is neutralized with dilute sodium bicarbonate solution, the acetone evaporated in vacuo and the resulting suspension filtered. The dry precipitate is recrystallized from acetone-hexane and furnishes the pure acetonide of the following properties: M.P. about 253–255°; $[\alpha]_D^{23}$ +150° (c. 0.35 in CHCl₃).

$\lambda_{max}^{alc.}$ 238 mμ (ε=17,400); $\lambda_{max}^{Nujol}$ 3.01, 5.86, 6.05μ

*Analysis.*—Calcd. for $C_{24}H_{33}O_5F$ (420.50): C, 68.54; H, 7.91. Found: C, 68.72; H, 7.97.

This substance possesses three times the activity of cortisone acetate in the rat liver glycogen assay.

EXAMPLE 8

16α,17α-isopropylidene 9α-chloro-11β,16α,17α-trihydroxyprogesterone (VII)

Following the procedure of Example 7 but substituting an equivalent amount of 9α-chloro-11β,16α,17α-trihydroxyprogesterone for the 9α-fluoro compound, there is obtained 16α,17α-isopropylidene 9α-chloro-11β,16α,17α-trihydroxyprogesterone.

EXAMPLE 9

16α,17α-isopropylidene 9α-fluoro-$\Delta^4$-pregnene-16α,17α-diol-3,11,20-trione (VIII)

To a stirred solution of 50 mg. of 16α,17α-isopropylidene-9α-fluoro-$\Delta^4$-pregnene-11β,16α,17α-triol-3,20-dione in 5 ml. of pure acetone is added dropwise 1.2 ml. of a solution of 200 mg. of chromic acid, 320 mg. of sulfuric acid and 1 ml. of water in 9 ml. of acetone. After 30 minutes alcohol is added, the mixture diluted into water and the acetone removed in vacuo. Extraction of the suspension with chloroform and washing of the chloroform extract with water followed by sodium bicarbonate and drying over sodium sulfate yields after evaporation of the solvent the trione which is recrystallized from acetene-hexane.

EXAMPLE 10

*16α,17α-isopropylidene 9α-chloro-Δ⁴-pregnene-16α, 17α-diol-3,11,20-trione (IX)*

Following the procedure of Example 9, but substituting an equivalent amount of 16α,17α-isopropylidene-9α-chloro-Δ⁴-pregnene-11β,16α,17α-triol-3,20-dione for the 9α-fluoro compound, there is obtained 16α,17α-isopropylidene 9α-chloro-Δ⁴-pregnene-16α,17α-diol-3,11,20-trione.

Furthermore, by substituting 9α-fluoro-Δ¹,⁴-pregnadiene-11β,16α,17α-triol-3,20-dione and 9α-chloro-Δ¹,⁴-pregnadiene-11β,16α,17α-triol-3,20-dione for the starting materials in Examples 7 through 10, the corresponding 1-dehydro derivatives are obtained.

Moreover, if other ketones and aldehydes are substituted for the actone in the procedure of Examples 7 and 8, the corresponding acetal and ketal derivatives are obtained. Thus methylethylketone yields the corresponding 16α,17α-(2'-butylidene) derivatives; methylisobutylketone yields 16α,17α-(4'-methyl-2'-pentylidene) derivatives; cyclohexanone yields 16α,17α-cyclohexylidenes; diethylketone yields 16α,17α-(3'-pentylidenes); and paraldehyde yields 16α,17α-ethylidenes.

The invention may be variously otherwise embodied within the scope of the appended claims.

What is claimed is:

1. 9α-halo-11β,16α,17α-trihydroxyprogesterone, wherein the halo has an atomic number less than 53.
2. A steroid selected from the group consisting of Δ⁴,⁹⁽¹¹⁾-pregnadiene-16α,17α-diol-3,20-dione and Δ¹,⁴,⁹⁽¹¹⁾-pregnatriene-16α,17α-diol-3,20-dione.
3. A steroid selected from the group consisting of 9β,11β-epoxy-16α,17α-dihydroxyprogesterone and 9β,11β-epoxy-Δ¹,⁴-pregnadiene-16α,17α-diol-3,20-dione.
4.

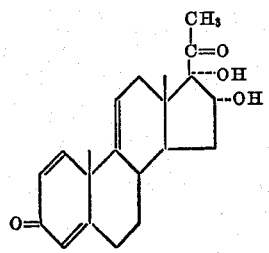

5. A steroid selected from the group consisting of 9α-halo-11β,16α,17α-trihydroxyprogesterone and 9α-halo-Δ¹,⁴-pregnadiene-11β,16α,17α-triol-3,20-dione, wherein the halo has an atomic number less than 53.
6. 9α-bromo-11β,16α,17α-trihydroxyprogesterone.
7. 9α-chloro-11β,16α,17α-trihydroxyprogesterone.
8. 9α-fluoro-11β,16α,17α-trihydroxyprogesterone.

No references cited.